United States Patent [19]

Sherman

[11] Patent Number: 5,215,281
[45] Date of Patent: Jun. 1, 1993

[54] TWO-PIECE CUSHION INSERT FOR U-BOLT CLAMP ASSEMBLY

[75] Inventor: Clarence A. Sherman, Birmingham, Mich.

[73] Assignee: ZSI, Inc., Livonia, Mich.

[21] Appl. No.: 767,253

[22] Filed: Sep. 27, 1991

[51] Int. Cl.[5] .............................................. F16L 3/08
[52] U.S. Cl. .................................... 248/74.1; 248/62; 248/219.4; 248/230
[58] Field of Search ............... 248/74.1, 219.4, 230, 248/231.6, 62, 74.4; 49/475

[56] References Cited

U.S. PATENT DOCUMENTS

| | | | |
|---|---|---|---|
| 1,853,467 | 4/1932 | Simpson et al. | 49/475 |
| 3,227,406 | 1/1966 | Shelton et al. | 248/74.4 |
| 3,286,963 | 11/1966 | Bergman | 248/74.1 |
| 3,559,933 | 2/1971 | Castellani | 248/74.1 |
| 3,564,676 | 2/1971 | Oeser | 248/74.4 X |
| 3,641,707 | 2/1972 | Kellos | 49/488 X |
| 4,267,994 | 5/1981 | Lynch et al. | 248/74.1 X |
| 4,744,535 | 5/1988 | Patenaude | 248/74.1 |
| 4,927,103 | 5/1990 | Nicholson | 248/62 |
| 4,934,635 | 6/1990 | Sherman | 248/74.1 |
| 5,007,604 | 4/1991 | Richards | 248/62 |
| 5,014,940 | 5/1991 | Sherman | 248/74.1 |
| 5,028,020 | 7/1991 | Sundholm | 248/74.4 |

OTHER PUBLICATIONS

Vermatic Products, Inc., "Vermatic Clamps".
Stauff Corporation, "Stauff Clamps", Catalog 189 (1989).

*Primary Examiner*—David M. Purol
*Attorney, Agent, or Firm*—Harness, Dickey & Pierce

[57] ABSTRACT

A two-piece cushion insert for a U-bolt clamp assembly for securing large diameter elongate cylindrical members, such as pipe, tubing, conduit or hose, to a support surface is disclosed. The cushion insert comprises a base member and a cushion strip member which cooperate to provide a passageway that encompasses the cylindrical member. The base member includes a concave portion for receiving the cylindrical member and two flange portions each having a shoulder extending upwardly and inwardly away from the flange portion. The cushion strip is of uniform cross-section and has an outer surface having raised portions that define an arcuate saddle for receiving the U-bolt and for preventing relative axial movement between the U-bolt and the cushion insert. Once assembled in the U-bolt clamp assembly, the cushion strip is securely supported at its ends between the U-bolt and the shoulders of the flange portions.

16 Claims, 3 Drawing Sheets

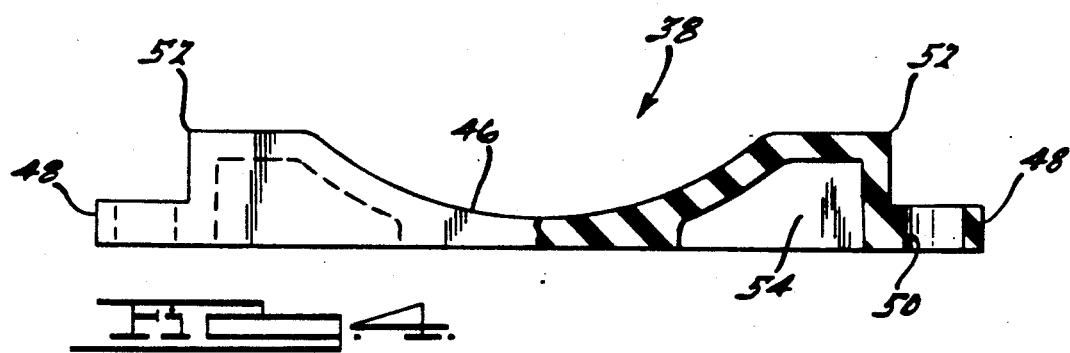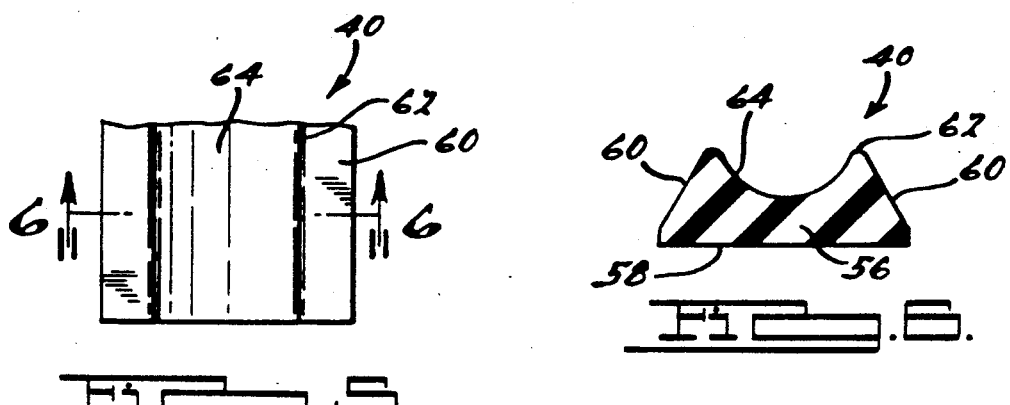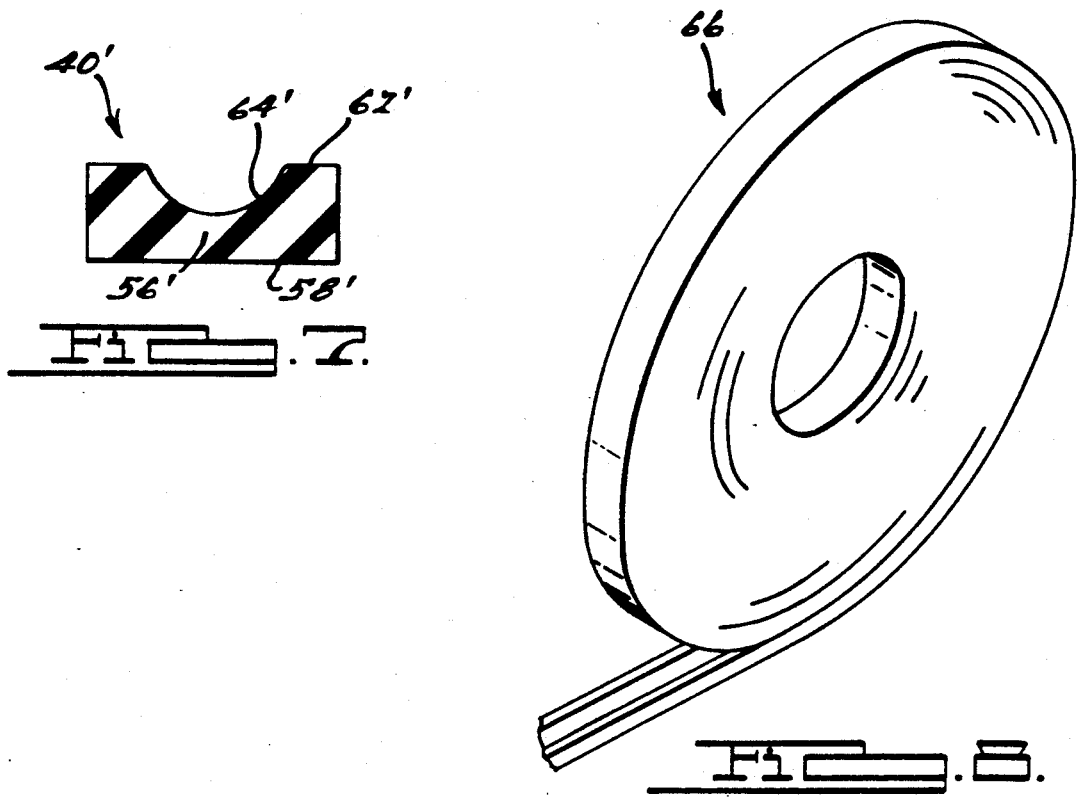

TWO-PIECE CUSHION INSERT FOR U-BOLT CLAMP ASSEMBLY

BACKGROUND OF THE INVENTION

1. Field of the Invention

The present invention relates generally to a cushion insert for a clamp assembly for securing elongate cylindrical members, such as pipe, conduit, tubing or hose, to a support surface, and more particularly, to a two-piece cushion insert for a U-bolt clamp assembly for securing large diameter elongate cylindrical members therein.

2. Description of Related Art

Presently, there exists a clamp assembly for securing an elongate cylindrical member to a support surface having a one-piece, split-sleeve, shock absorbing cushion insert, a U-shaped rod member and fastening means. The cylindrical member is encompassed by the cushion insert which is, in turn, adapted to be retained by the U-shaped rod member. When the U-shaped rod member is secured to the support surface by the fastening means, the clamping force generated by the U-shaped rod member is distributed about a circumferential section of the cylindrical member by the cushion insert.

An example of such a clamp assembly is disclosed in U.S. Pat. No. 5,014,940, issued May 14, 1991, by Inventor Clarence A. Sherman, the disclosure of which is hereby incorporated by reference. As shown in FIG. 1, the patented clamp assembly 10 includes an injection molded, elastomeric, one-piece cushion insert 12 for circumferentially engaging the cylindrical member 14 which is retained within the clamp assembly 10 by a U-bolt 16. The cushion insert 12 of the '940 patent comprises a generally planar base portion 18 with upwardly and inwardly extending arcuate side walls 20 that combine to define a passageway 22 which extends axially through the cushion insert 12. At the top of the passageway 22 is an axial gap 24 that separates the side walls 20. Located in the base portion 18, opposite from the gap 24, is an axial slot 26 which acts as a hinge. The gap 24 and the slot 26 operatively cooperate to allow the cushion insert 12 to flex and be adapted to fit about the cylindrical member 14. The base portion 18 and side walls 20 also have an arcuate saddle for accommodating the U-bolt 16 so that the U-bolt 16 is secured relative to the cushion insert 12 and the clamping force generated by the U-bolt 16 is distributed about a circumferential section of the cylindrical member 14 which is encompassed by the cushion insert 12.

One disadvantage of the cushion insert used in the clamp assembly described above is that in certain applications where the cylindrical member desired to be secured by the clamping assembly is of sufficiently large diameter, an extremely large force is required to flex the side walls of the cushion insert sufficiently apart to enable the cushion insert to fit over and about the cylindrical member, regardless of the presence of a "hinge." A further disadvantage of the prior known cushion insert of the type discussed is that the manufacturing of the cushion insert in sizes that can accommodate large diameter cylindrical members becomes economically impractical.

It is, therefore, one object of the present invention to provide an economical and easy-to-use two-piece cushion insert for use in a U-bolt clamp assembly which can be used for tubing, pipes and other cylindrical members having diameters of up to at least twenty four inches.

It is another object of the present invention to provide a two-piece cushion insert for use in a U-bolt clamp assembly that can transmit the clamping force of the U-bolt along the entire width of the cushion insert surface that is in engagement with the cylindrical member.

It is a further object of the present invention to provide a cushion strip of a uniform cross-section for use in a U-bolt clamp assembly that can be cut to the appropriate length for a variety of cylindrical member sizes.

SUMMARY OF THE INVENTION

Accordingly, the present invention is a two-piece cushion insert for use in a U-bolt clamp assembly that secures cylindrical members having sufficiently large diameters to a support surface. The cushion insert comprises a base member and a cushion strip member which cooperate to provide a passageway that encompasses the cylindrical member. The base member includes a concave portion for receiving the cylindrical member and two flange portions each having a shoulder extending upwardly and inwardly away from the flange portion. The cushion strip is of uniform cross-section and has an outer surface having raised portions that define an arcuate saddle for receiving the U-bolt and for preventing relative axial movement between the U-bolt and the cushion insert. The saddle also serves to distribute the clamping force imparted by the U-bolt across the entire width of the cushion strip surface that engages the cylindrical member. Once assembled in the U-bolt clamp assembly, the cushion strip is securely supported at its ends between the U-bolt and the shoulders of the flange portions.

In an alternate embodiment of the present invention, the cushion insert is comprised of the cushion strip having an alternative cross-sectional configuration. In this embodiment, the cushion strip, which may be manufactured in roll form, is cut to the desired length which corresponds to the circumference of the cylindrical member.

One advantage of the present invention is that a cushion insert may be provided for a U-bolt clamp assembly for securing large diameter cylindrical members which is easily disposed over and about the cylindrical member without requiring the disassembly of the cylindrical member. Another advantage of the present invention is that a cushion insert may be provided for a U-bolt clamp assembly for securing large diameter cylindrical members which transmits the clamping force of the U-bolt along the entire width of the cushion insert surface that is in engagement with the cylindrical member. A further advantage of the present invention is that a cushion insert for a U-bolt clamp assembly for securing large diameter cylindrical members may also be provided in strip form to accommodate a variety of large diameters of cylindrical members. A still further advantage of the present invention is that large diameter cylindrical members carrying water or other fluids of substantial weight may be secured with an economical and efficient clamping system that includes a cushion insert which prevents metal-to-metal contact, suppresses noise and acts as a shock and vibration damper.

Other advantages of the present invention will become apparent to one skilled in the art as the invention becomes better understood upon reference to the following detailed description in view of the accompanying drawings.

BRIEF DESCRIPTION OF THE DRAWINGS

FIG. 4 is a front elevation view, in partial cross-section, of the base member of the cushion insert of FIG. 2;

FIG. 5 is a partial plan view showing the cushion strip member of the cushion insert of FIG. 2;

FIG. 6 is a cross-sectional view of the cushion strip member of the cushion insert of FIG. 2 taken along line X—X of FIG. 5;

FIG. 7 is a cross-sectional view of an alternative embodiment of the cushion strip member of the cushion insert of FIG. 2; and FIG. 8 is an isometric view showing the cushion strip member of FIG. 7 in roll form.

DESCRIPTION OF THE PREFERRED EMBODIMENTS

It should be understood from the outset that while the following discussion relates to particular embodiments of the present invention, these embodiments merely represent a best mode of currently practicing the invention and other modifications may be made to the particular embodiments without departing from the spirit and scope of the invention.

Figure 1:
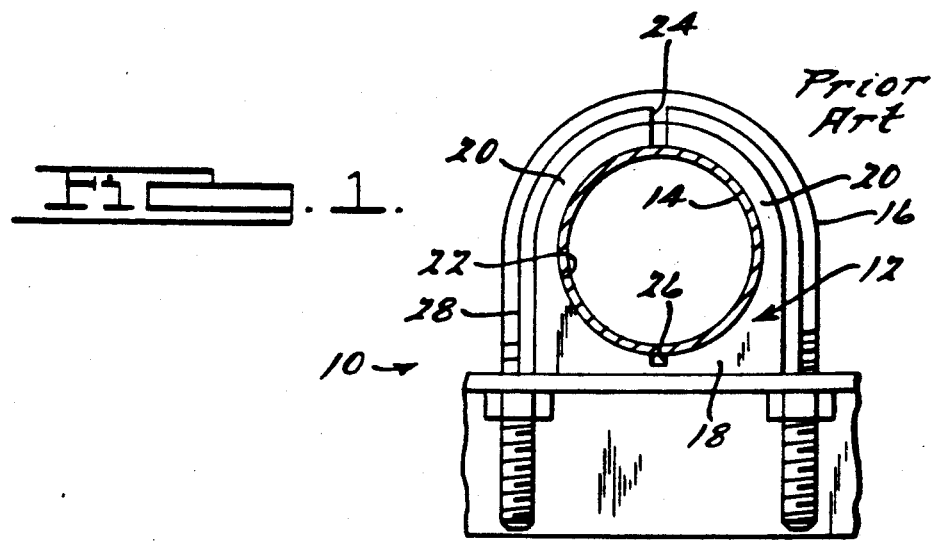
FIG. 1 is a front elevation view showing a U-bolt clamp assembly having a conventional cushion insert.
Figure 2:
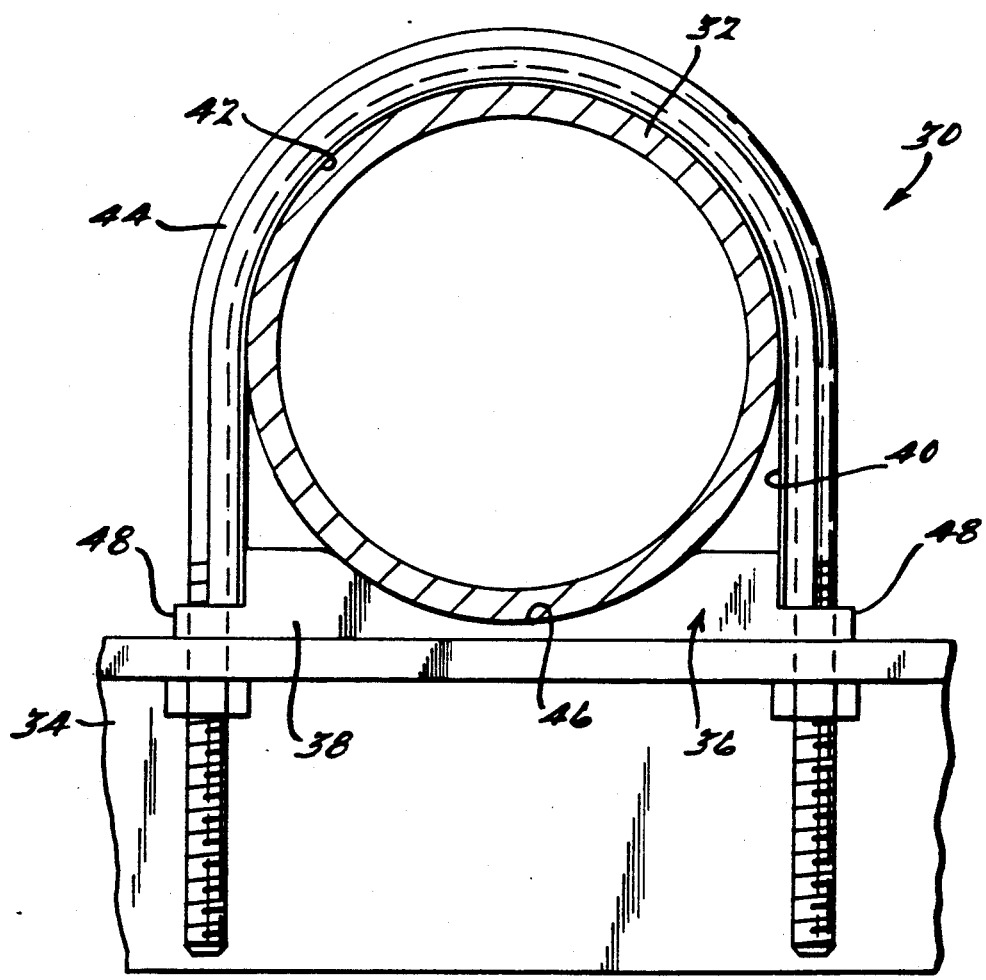
FIG. 2 is a front elevation view showing a U-bolt clamp assembly having a cushion insert according to the teachings of the present invention.
Figure 3:
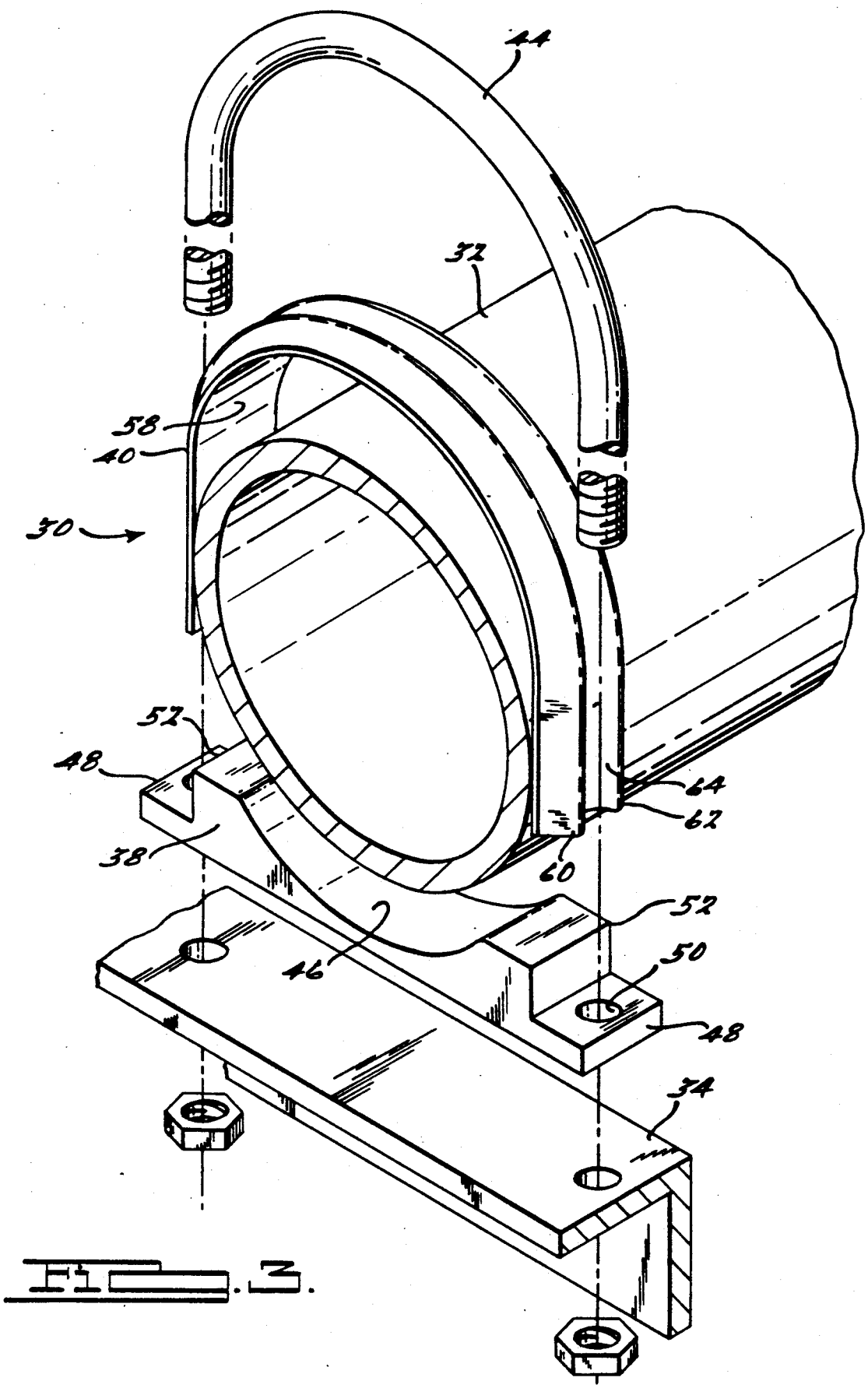
FIG. 3 is an exploded isometric view of the U-bolt clamp assembly of FIG. 2.

Referring to FIG. 2, a U-bolt clamp assembly 30 for securing large diameter elongate cylindrical members 32 to a support surface 34 having a two-piece cushion insert 36 according to the teachings of the present invention is shown.

As illustrated in FIGS. 2-7, the two-piece cushion insert 36 comprises a base member 38 and a cushion strip member 40 which operatively cooperate to provide a passageway 42 that encompasses the cylindrical member 32. FIG. 2 shows that direct contact between the U-bolt 44, the cushion insert 36 and the cylindrical member 32, or between the support surface 34, the base member 38 and cylindrical member 32, due to the clamping force of the U-bolt 44, occurs at approximately 180 circumferential degrees of the cylindrical member 32 that is positioned furthest away from the support surface 34 and at between approximately 80 and 100 circumferential degrees of the cylindrical member 32 that is positioned closest to the support surface 34.

The base member 38 is designed to be supported by the support surface 34 and has a concave portion 46 which is adapted to receive the cylindrical member 32. The radius of curvature of the concave portion 46 is determined by the size and shape of the cylindrical member 32 that is to be secured by the clamp assembly 30.

The base member 38 also includes two flange portions 48 which extend outwardly away from the concave portion 46. The flange portions 48 have apertures 50 which allow the threaded portions of the U-bolt 44 to pass through the base member 38 and axially secure it relative to the U-bolt 44, to the support surface 34. The flange portions 48 also have shoulders 52 which extend upwardly and inwardly toward the concave portion 46. Once assembled, the cushion strip member 40 of U-bolt clamp assembly 30 is securely supported at its ends between the U-bolt 44 and the shoulders 52 of the flange portions 48.

As best seen in FIG. 4, the base member 38 is formed with recesses 54 to increase the flexibility of the base member and thereby allow it to better absorb shock and vibration. Further, the recesses 54 facilitate the economical manufacture of the base member 38, which is injection molded from a thermoplastic elastomer material. One such material that has been found to be satisfactory in this regard is "Santoprene," a thermoplastic elastomer made by Monsanto Chemical Company. The axial width of base member 38 is substantially identical to the axial width of the cushion strip member 40.

As shown in FIGS. 5 and 6, the preferred embodiment of the cushion strip member 40 is of uniform cross-section 56 and has a generally flat inner surface 58 for engaging the cylindrical member 32. Raised side walls 60 extend to an outer surface 62 which is formed with a saddle portion 64 therein for receiving the U-bolt 44 when the clamp assembly 30 is assembled. The saddle portion 64 is formed in an arcuate configuration substantially corresponding to the diameter of the U-bolt 44. The saddle portion 64 serves to transmit the clamping force from the U-bolt 44 through the cushion strip member 40 substantially across the entire axial width of the inner surface 58 and to the cylindrical member 32. In this manner, the knife or line edge clamping force that the U-bolt 44 would otherwise transmit to the cylindrical member 32, if the cushion insert 36 were not utilized, is transmitted across a substantially wider circumferential section of the cylindrical member 32. The load distribution of the clamp assembly 30 is, therefore, significantly improved through incorporation of the cushion insert 3 of the present invention. The raised side walls 60 and the saddle portion 64 formed in the outer surface 62 of cushion strip member 40 also serve to prevent lateral movement along the cylindrical member 32 of the cushion strip member 40 relative to the U-bolt 44. It should be appreciated that it is desirable to keep the cushion insert 36 centered under the U-bolt 44 to insure that the clamping load exerted by the U-bolt is evenly distributed along the axial width of cushion strip member 40 and, consequently, to the cylindrical member 32.

The uniform cross-section 56 of the cushion strip member 40 may vary in configuration, as illustrated in FIGS. 6 and 7. FIG. 6 shows a cushion strip cross-section 56 having side walls 60 which incline from the inner surface 58 toward the outer surface 62, thereby making the cross-section 56 generally trapezoidal. However, in FIG. 7, an alternative embodiment of the cushion strip 40' is shown having a cross-section 56' that is a substantially rectangular configuration.

The solid core cross-sections 56, 56' of the cushion strip member 40, shown in FIGS. 6 and 7, permits the cushion strip to be extruded in roll form 66, as illustrated in FIG. 8. In addition, the cushion strip member 40 may be manufactured from the same thermoplastic elastomer material as the base member 38.

The axial length of the passageway 42 operatively formed by the cushion insert 36 corresponds to the axial width or thickness of the base member 38 and the width of the cushion strip member 40, which as referred to above are substantially equal. These values, together with the radius of curvature of the concave portion 46 of the base member 38 and the length of the cushion strip member 40, vary with the diameter of the cylindrical member 32 that is to be secured by the clamp assembly 30 and ar proportional to the thickness of the cushion strip material between the U-bolt 44 and the cylindrical member 32 which is also proportional to the bolt radius of the U-bolt 44. Further, the saddle portion 64 of the cushion strip member 40 may also vary to accommodate U-bolts 44 of various bolt diameters. All these factors contribute to the final dimensions of the cushion insert 36.

In practice, the alternative cushion insert 40' is utilized by first determining the circumference of the elongate cylindrical member 32 to be secured by the clamp assembly and then cutting a length of cushion strip from a roll 66, as shown in FIG. 8, that corresponds to that circumference. The cushion strip is then wrapped around the cylindrical member with the inner surface 58' contacting the cylindrical member. A U-bolt is placed over the cushion strip so that it rests in the saddle portion 64' of the cushion strip 40'. The U-bolt is then fastened to the support surface to secure the cushion strip and cylindrical member. The cushion strip 40' is configured such that its outer surface 62', which is substantially planar, contacts the support surface at the point at which the cylindrical member and the support surface are closest together. The rectangular outer surface 62' provides a stable surface for transmitting clamping force of the U-bolt through the cylindrical member to the support surface 34. In the preferred method of installing the cushion strip of this embodiment of the present invention, the free ends of the cushion strip are butted together at the point along the circumference of the cylindrical member furthest away from the support surface so that the ends of the cushion strip remain clamped between the cylindrical member and the U-bolt. Again it should be appreciated that direct contact between the U-bolt, the cushion strip and the cylindrical member, or between the support surface, cushion strip and cylindrical member due to the clamping force of the U-bolt, occurs at approximately 180 circumferential degrees of the cylindrical member that is positioned furthest away from the support surface and at approximately the point on the circumference of the cylindrical member that is closest to the support surface.

The cushion insert according to the present invention is useful when encountering clamping situations that require the securing of relatively large diameter pipe and the like (ranging from at least approximately 10 inches in diameter to sizes up to at approximately least twenty-four inches in diameter), such that injection molding a cushion insert in such a large size and flexibly spreading the cushion insert to fit over the pipe becomes impractical. In addition, the cushion insert of the present invention can be modified to fit any size U-bolt clamping assembly used to secure a large diameter pipe. Of course, the various physical dimensions of the cushion insert are proportional to the diameter of the cylindrical member desired to be secured and may be altered accordingly.

The present invention has been described in an illustrative manner. It is to be understood that the terminology which has been used is intended to be in the nature of words of description rather than of limitation. Obviously, many modifications or variations of the present invention are possible in light of the above teachings. Therefore, within the scope of the appended claims, the present invention may be practiced otherwise than as specifically described.

What is claimed is:

1. A two-piece cushion insert adapted to be disposed about a cylindrical member which is secured to a support surface within a U-bolt clamp assembly, said cushion insert comprising:
   a base member adapted to be supported by said support surface, said base member having a substantially planar lower surface in contact with said support surface, an upper surface provided with a concave portion for receiving said cylindrical member, and two flange portions each extending in a direction laterally outwardly from said concave portion, each said flange portion having a shoulder portion extending upwardly away from said flange portion and inwardly toward said concave portion; and
   a cushion strip member of uniform cross-section having an outer surface provided with a saddle portion forming an arcuate recess for retainably engaging a U-shaped bolt member and a substantially planar inner surface for engaging said cylindrical member; whereby said base member and said cushion strip member operatively cooperate to provide a passageway for substantially circumferentially encompassing said cylindrical member, said cushion strip member being securely supported at the ends thereof between said U-shaped bolt member and said shoulder portion of each said flange portion of said base member.

2. A cushion insert as set forth in claim 1 wherein said flange portions of said base member are provided with aperture means for said U-shaped bolt member to pass therethrough for securing said base member to said support surface relative to said U-shaped bolt member.

3. A cushion insert as set forth in claim 1 wherein said base member of said cushion insert is provided with a plurality of recesses that extend upwardly from said lower surface of said base member and into said shoulder portions of said base member.

4. A cushion insert as set forth in claim 1 wherein said cushion insert is made from the material santoprene.

5. A cushion insert as set forth in claim 1 wherein said uniform cross-section of said cushion strip member of said cushion insert has side walls which incline from said inner surface toward said outer surface.

6. A cushion insert as set forth in claim 1 wherein said uniform cross-section of said cushion strip member of said cushion insert is substantially rectangular.

7. A cushion strip having a substantially rectangular uniform cross-section and a pre-determined axial length adapted to be disposed about a cylindrical member secured to a support surface within a U-bolt clamp assembly, said cushion strip comprising:
   a planar inner surface for engaging said cylindrical member; and
   a substantially planar outer surface provided with a saddle portion for retainably engaging a U-shaped bolt member which attaches said cylindrical member to a support surface;
whereby said cushion strip is positioned about the circumference of said cylindrical member within said U-bolt clamp assembly such that the free ends of said cushion strip are butted together at a point along the 180° of said circumference of said cylindrical member that is furthest away from said support surface.

8. A cushion strip as set forth in claim 7 wherein said pre-determined axial length of said cushion strip is substantially equivalent to said circumference of said cylindrical member.

9. A cushion strip as set forth in claim 7 wherein said saddle portion has a generally arcuate configuration substantially corresponding to the bolt diameter of said U-shaped bolt member.

10. A cushion strip as set forth in claim 7 wherein said cushion strip is made from the material santoprene.

11. A U-bolt clamp assembly for securing a cylindrical member to a support surface, comprising:
   a U-shaped bolt member for attaching said clamp assembly to said support surface;
   fastening means for retaining said U-shaped bolt member to said support surface; and
   a two-piece cushion insert for absorbing vibration and shock adapted to be disposed about said cylindrical member, said two-piece cushion insert comprising a base member having a substantially planar lower surface in contact with said support surface, an upper surface provided with a concave portion for receiving said cylindrical member, and two flange portions each extending in a direction laterally outwardly from said concave portion, each said flange portion having a shoulder portion extending upwardly from said flange portion and inwardly toward said concave portion, and a cushion strip member of uniform cross-section having an outer surface provided with a saddle portion forming an arcuate recess for retainably engaging said U-shaped bolt member and a substantially planar inner surface for engaging said cylindrical member;
   whereby said base member and said cushion strip member operatively cooperate to provide a passageway for substantially circumferentially encompassing said cylindrical member, said cushion strip member being securely supported at the ends thereof between said U-shaped bolt member and said shoulder portion of each said flange portion of said base member.

12. A clamp assembly as set forth in claim 11 wherein said flange portions of said base member are provided with aperture means for said U-shaped bolt member to pass therethrough for attaching said clamp assembly to said support surface and operatively securing said base member relative to said U-shaped bolt member and said cushion insert about said cylindrical member by exerting a substantially evenly distributed clamping force along the periphery of said inner surface of said cushion insert.

13. A clamp assembly as set forth in claim 11 wherein said base member of said cushion insert is provided with a plurality of recesses that extend upwardly from said lower surface of said base member and into said shoulder portions of said base member.

14. A clamp assembly as set forth in claim 11 wherein said cushion insert is made from the material santoprene.

15. A clamp assembly as set forth in claim 11 wherein said uniform cross-section of said cushion strip member of said cushion insert has side walls which incline from said inner surface toward said outer surface.

16. A clamp assembly as set forth in claim 11 wherein said uniform cross-section of said cushion strip member of said cushion insert is substantially rectangular.

* * * * *